(No Model.)
L. D. CASTLE.
VALVE.
No. 530,393. Patented Dec. 4, 1894.
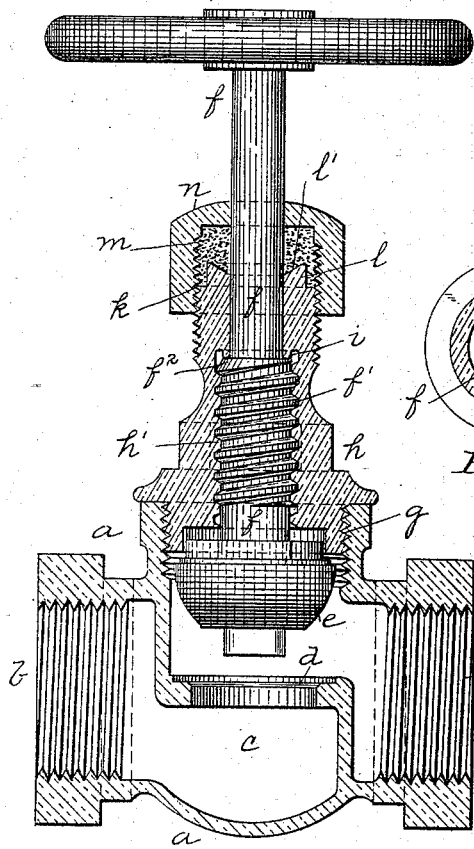
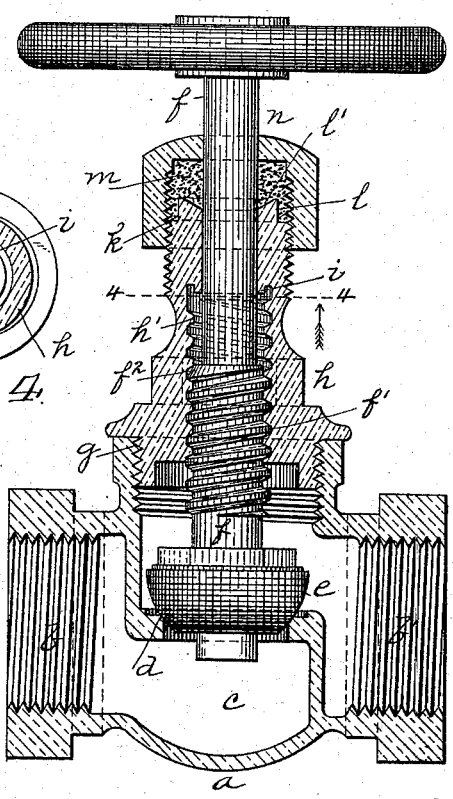
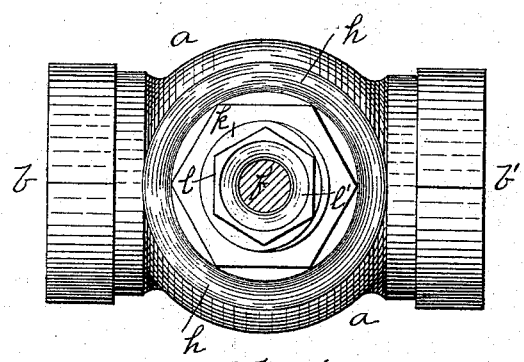
Witnesses:
L. DeB. Little.
Luella H. Knox.
Inventor.
Lewis D. Castle
By Kay, Totten & Cooke
Attorneys.

UNITED STATES PATENT OFFICE.

LEWIS D. CASTLE, OF GREENSBURG, PENNSYLVANIA, ASSIGNOR TO JOHN T. KELLY, OF BROOKLYN, NEW YORK, AND GEORGE M. JONES, OF PITTSBURG, PENNSYLVANIA.

VALVE.

SPECIFICATION forming part of Letters Patent No. 530,393, dated December 4, 1894.

Application filed March 9, 1894. Serial No. 502,963. (No model.)

*To all whom it may concern:*

Be it known that I, LEWIS D. CASTLE, a resident of Greensburg, in the county of Westmoreland and State of Pennsylvania, have invented a new and useful Improvement in Valves; and I do hereby declare the following to be a full, clear, and exact description thereof.

My invention relates to valves.

The object of my invention is to provide a stuffing-box in which the packing is so securely held as to prevent its turning with the stem and the consequent turning of the cap of the stuffing box, whereby the wear and tear on the packing are diminished, while at the same time the packing may be readily removed.

To these ends my invention comprises, generally stated, the combination with a valve, of a hood having at its upper end a shelf or ledge and beyond and integral with the same a polygonal bearing block projecting therefrom, a traversing stem passing through the hood and carrying the valve, and a packing cap screwing onto the hood, a polygonal outer surface of the bearing block engaging with the packing and preventing it from turning.

To enable others skilled in the art to make and use my invention, I will describe the same more fully, referring to the accompanying drawings, in which—

Figure 1 is a vertical section of my improved valve when open. Fig. 2 is a like view when closed. Fig. 3 is a top view showing the screw cap and handle or wheel removed, and Fig. 4 is a cross-section on the line 4—4 Fig. 2 looking in the direction of the arrow.

Like letters indicate like parts in each figure of the drawings.

I have illustrated my invention in connection with the ordinary globe-valve $a$ which is provided with the inlet and outlet ports $b\ b'$, which are threaded interiorly to receive the pipe connections. The valve chamber $c$ is provided with the valve seat $d$ within which the valve $e$ on the end of the stem $f$ is adapted to seat itself. The valve $a$ is provided with the threaded connection $g$ with which the hood $h$ engages. This hood $h$ is threaded on the interior as at $h'$, and with said threaded interior $h'$ the threaded portion $f'$ of the stem $f$ engages, so that upon the turning of said stem the valve $e$ is seated or unseated as desired. Within the hood $h$ is the annular valve seat $i$ with which the last thread $f^2$ of the threaded portion $f'$ on the stem $f$ engages. This thread $f^2$ is adapted to fit snugly around the annular seat $i$ and act as a valve, when the main valve $e$ is open and said valve $f^2$ has been drawn up against said annular seat $i$. This prevents the steam from escaping up around the valve stem $f$ when the valve $e$ is open. This provides a very simple and inexpensive form of valve, as the annular seat $i$ may be formed at the same time as the threads $h'$ by simply allowing the milling tool which forms said threads to continue to work for a short time after said threads have been formed. The last thread $f^2$ of the stem $f$ without any change in form provides a valve for engaging the seat $i$, so that there is practically no extra work entailed in the construction of this valve. The hood $h$ is further provided with the ledge or shelf $k$ and the angular bearing block $l$ extending therefrom. The said bearing block $l$ is in the form of a nut and may be quadrangular, hexagonal or of a greater number of faces. The bearing block $l$ is dished or countersunk, as at $l'$. Packing $m$ of any suitable material is wound around the bearing block $l$ and rests upon the ledge or shelf $k$. The packing also surrounds the stem $f$ adjacent to the bearing block $l$. When the packing has been wound around the stem the cap $n$ is screwed down over the bearing block $l$. This will act to force the packing $m$ down into the dished portion $l'$ of said bearing block $l$, also to bind the packing closely around the angular edges of the bearing block $l$ and down on the ledge $k$. By this construction I obtain a valve stem tightly packed to prevent the escape of the steam. Furthermore the packing is bound so tightly in place that upon turning the stem the packing remains stationary and does not turn with the stem. This acts to prevent the wearing away of the packing and increases its life.

If it is desired to remove the packing $m$ the stem $f$ is turned until the valve $f^2$ is seated within the annular seat *i* of the hood *h*. This will prevent the escape of steam around the stem when the packing is removed and prevent injury to the person doing the work.

By removing the cap *n* the packing *m* can be readily removed. While the dished portion *l'* of the bearing block *l* receives the packing forced down therein, yet the shape of said dished portion allows of the ready removal of the packing material even though it may have become hard and tightly wedged therein.

My improved stuffing box is not limited in its scope to any particular form of valve or valve-stem.

What I claim as my invention, and desire to secure by Letters Patent, is—

1. In a valve, the combination of a hood having at its upper end a shelf or ledge and beyond and integral with the same a polygonal bearing block of smaller diameter than the interior diameter of the screw threaded cap projecting therefrom, a traversing stem passing through the hood and carrying the valve, and a packing cap engaging with said hood, substantially as and for the purposes set forth.

2. In a valve, the combination of a hood having at its upper end a shelf or ledge and beyond and integral with the same a polygonal bearing block of smaller diameter than the interior diameter of the screw-threaded cap projecting therefrom, said bearing block being dished or countersunk, a traversing stem passing through the hood and carrying the valve, and a packing cap engaging with the hood, substantially as and for the purposes set forth.

In testimony whereof I, the said LEWIS D. CASTLE, have hereunto set my hand.

LEWIS D. CASTLE.

Witnesses:
CHAS. E. WHITE,
W. C. LOOR.